Dec. 23, 1924.   1,520,429
E. H. NEWTON ET AL
PENDULUM LEVEL
Filed Jan. 5, 1923
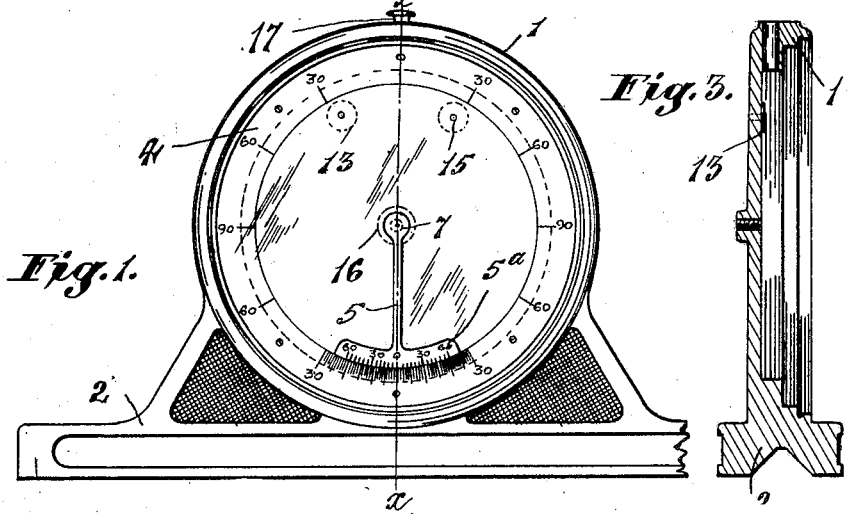
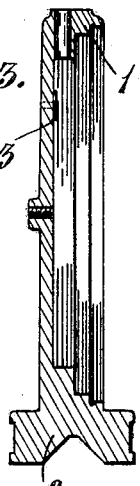
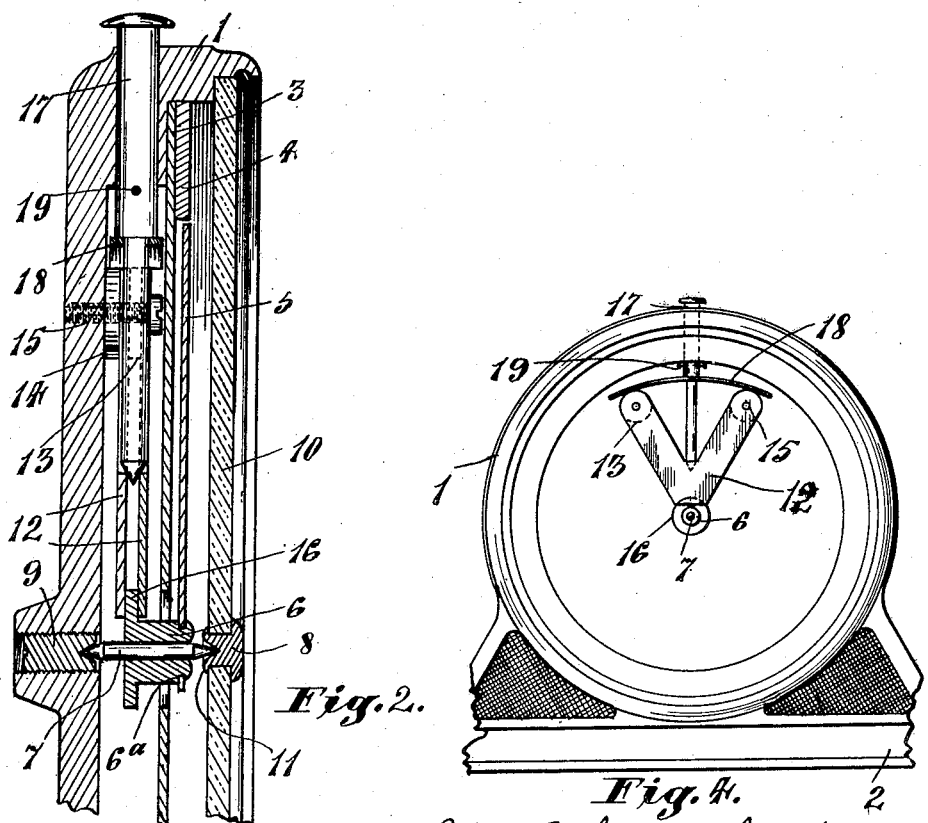
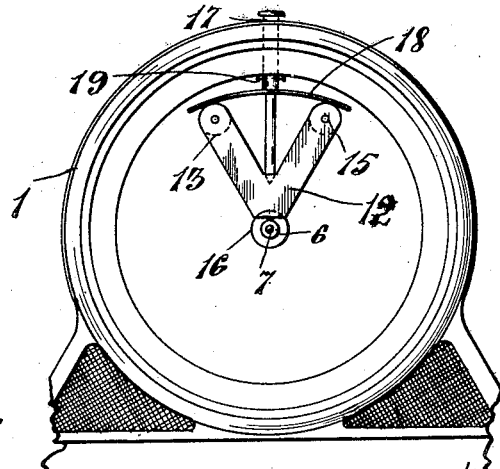
Edward Henry Newton
John Sutter, Inventors,
by G. H. Snow & Co., Attys.

Patented Dec. 23, 1924.

1,520,429

UNITED STATES PATENT OFFICE.

EDWARD HENRY NEWTON AND JOHN SUTTER, OF BIRMINGHAM, ENGLAND.

PENDULUM LEVEL.

Application filed January 5, 1923. Serial No. 610,897.

*To all whom it may concern:*

Be it known that we, EDWARD HENRY NEWTON and JOHN SUTTER, respectively British subject and Swiss subject, and residents of Birmingham, Warwickshire, England, have invented a new and useful Improvement in Pendulum Levels, of which the following is a specification.

This invention comprises certain improvements in levels, clinometers or the like of the type comprising a pointer which is adapted to move by gravity in relation to a scale for the purpose of testing the inclination to the horizontal of a surface or otherwise testing the angularity of an object, and particularly relates to a level or clinometer which is provided with a base for resting on the surface to be tested. The object of this invention is to construct a level or clinometer which will be more sensitive than the usual spirit level, and in which the pointer or indicator would be held in its position relative to the scale for the purpose of enabling the level or clinometer to be removed from the object tested and the necessary readings taken thereafter.

In the drawing:

Figure 1 is a face view of an instrument constructed according to this invention.

Figure 2 is a section on line $xx$ of Figure 1 showing the upper portion of the instrument only and showing the indicator directed upwardly.

Figure 3 is a central transverse section of the case of the instrument.

Figure 4 is a face view of the instrument showing the pivot pin locking device.

According to one convenient embodiment of this invention as shown by Figures 1 to 4, the instrument comprises a cast aluminum case 1 which is fitted with a cast iron base 2. The case 1 and the base 2 may be formed of any other suitable material and may be formed as a single member. The dial may comprise a disc 3 carried by the case 1 and this disc 3 has the graduated ring 4 fixed thereto. The pointer or indicator 5 is carried by a boss 6 which is pressed or otherwise fixed on the hardened steel pivot pin 7. The indicator 5 is fixed rigidly against the shoulder $6^a$ conveniently by spinning back the metal of the boss 6. The pivot pin is mounted in bearings 8 and 9. The bearing 8 is formed of brass or other suitable metal or may carry jewels, and is fixed to the glass cover 10 by spinning back or flanging the edge of the metal to form the flange 11 bearing on the inside of the glass. The bearing 9 comprises a screwed pin formed from brass or other suitable metal which may also carry a jewel and which is screwed into a tapped hole in the back of the case 1. The pivot pin 7 has pointed ends which take a bearing in recesses in the bearings 8 and 9, the angle of the recesses in the bearings 8 and 9 being conveniently 60 degrees, whilst the angle of the pointed ends of the pivot pin 7 is conveniently 50 degrees. The indicator 5 is conveniently provided with an arcuate end $5^a$ which is graduated to give a vernier reading with the graduated ring 4. The arcuate end $5^a$ of the pointer is concentric with the ring 4. In some forms of instruments a vernier reading may not be required, in which case an ordinary pointer may be used and the graduations may be marked directly on the ring 3. By thus mounting the indicator 5 friction is reduced to a minimum and such indicator will also hang in an accurate vertical position. The pointer is normally held stationary by means of a spring gripping device which engages the pivot pin. According to one form the spring gripping device comprises two plate springs 12 which are V-shaped as shown by Figure 4. The upper ends of these arms have distance members 13 placed therebetween and the arms are fixed against the boss or washer 14 on the back of the case 1 by means of pins 15. The two spring members 12 are adapted to normally close in towards one another to grip the collar 16 of the boss 6. A pin 17 is slidably mounted in the case 1, and the inner end thereof is pointed and is adapted to pass between the plates to force the same apart and thus release the grip on the flange 16. A spring 18 is adapted to bear at each outer end on the ends of the springs 12 and at its middle on a shoulder on the pin 17 to normally force the pin out of engagement with the plates 12, the peg 19 limiting the upward movements of such pin 17.

With this instrument therefore the indicator 5 is normally held in the stationary position by the spring gripping plates 12. When it is desired to test the level or inclination of a surface the instrument is applied to such surface and the pin 17 depressed which releases the pointer and allows the same to move by gravity to give the required reading. On releasing the pin 17 the indicator is held in the position to which it has moved and therefore the protractor can be removed and the reading taken. This protractor level therefore can be applied to the underside of objects or to objects on which it would be inconvenient or impossible to place a spirit level and read the same. Further the needle is very delicately mounted which ensures that the instrument will be very sensitive, whilst the plates 12 bear upon the pivot pin in such a manner that there is no liability of the indicator being moved when the pointer is being locked in position. The pin 9 enables the bearings to be adjusted and such pin may be fixed in the adjusted position by sealing.

If desired the indicator 5 may be weighted and the weight may if desired, be located on the inside of the dial, but it is preferred not to add the separate weight to the indicator as a much more sensitive instrument can be obtained without said weight. The indicator may be damped down to prevent undue oscillation before coming to rest by means of the plate springs 12 and pin 17. It has previously been proposed in clinometers to damp the action by spring pressure on the pivot pin.

Claims:

1. A clinometer comprising a case, a base having a flat testing surface carried by the case, a pivot pin carried by the case, an indicator carried by such pin, a collar on the pivot pin located on one side of the indicator, a spring device located on the same side of the indicator and adapted to bear on the opposite faces respectively of said collar for normally holding the pointer in any position to which it may have been moved when testing the inclination of a surface, and hand operated means for releasing the pressure of the spring device to permit of free movement of the pointer.

2. A clinometer comprising a case, a base having a flat testing surface carried by said case, a pivot pin carried by the case, an indicator carried by such pin, a collar on said pivot pin, a spring device comprising two V-shaped spring plates having their apex portions adapted to bear on opposite faces respectively of said collar for normally holding the pointer in any position to which it may have been moved when testing the inclination of a surface, and a conically pointed pin carried by said case and adapted to be forced between the two plates for releasing the spring pressure on the collar.

3. A clinometer comprising a case, a base having a flat testing surface carried by said case, a pivot pin carried by said case, an indicator carried by such pin, a collar on said pivot pin, a spring device comprising two V-shaped spring plates having their apex portions adapted to bear on opposite faces respectively of said collar for normally holding the pointer in any position to which it may have been moved when testing the inclination of a surface, a conically pointed pin carried by said case and adapted to be forced between the two plates for releasing the spring pressure on the collar, and a spring bearing on the conically pointed pin for normally urging said pin into position allowing the V-shaped spring plates to grip said collar.

In witness whereof we have signed this specification in presence of two witnesses.

EDWARD HENRY NEWTON.
JOHN SUTTER.

Witnesses:
J. E. S. LOCKWOOD,
H. L. HARDAKER.